Aug. 21, 1962  J. O. BAKER ETAL  3,050,707
METHOD AND APPARATUS FOR TORPEDO DIRECTION LOCATING
Filed Dec. 8, 1950  3 Sheets-Sheet 1

INVENTORS.
J. O. BAKER
N. N. ESTES
BY
G. D. O'Brien
R. M. Hicks  ATTYS.

Aug. 21, 1962    J. O. BAKER ETAL    3,050,707
METHOD AND APPARATUS FOR TORPEDO DIRECTION LOCATING
Filed Dec. 8, 1950    3 Sheets-Sheet 3

INVENTORS.
J. O. BAKER
N. N. ESTES
BY
ATTYS.

United States Patent Office 3,050,707
Patented Aug. 21, 1962

3,050,707
METHOD AND APPARATUS FOR TORPEDO DIRECTION LOCATING
Judd O. Baker, 4209 18th St. NW., Washington, D.C., and Nelson N. Estes, 319 Pinewood Ave., Silver Spring, Md.
Filed Dec. 8, 1950, Ser. No. 199,908
1 Claim. (Cl. 340—6)
(Granted under Title 35, U.S. Code (1952), sec. 266)

This invention relates generally to an improved acoustical method of torpedo or underwater objective direction finding and to an acoustical direction finder adapted for incorporation in the gun fire control ranging apparatus for shipboard anti-torpedo equipment. It is used in determining the presence of a sound emitting objective moving under water in the vicinity of a vessel, locating the instantaneous position thereof with respect to the vessel and determining its path of tavel thereafter with respect to a given shipboard reference axis, by continuous reception of the direction indicative emitted sounds and by viewing visual translated indications of the said sounds.

In prior methods and equipment for locating underwater objectives various means have been used. Generally they are of a type embodying the transmission of directed wave energy toward an objective and the reception by reflection of an echo impulse therefrom back to a receiving means incorporated in the direction finding apparatus. These systems depend for their proper functioning upon data derived from triangulations, one of which must include determination of a time cycle between the transmission of the directed wave energy which is directed to strike the object and the return to the source of any indication available for use from that objective. This is a relatively slow speed system of directional scanning. Moreover it has been found that these systems will tend to indicate false targets such as whales and other marine life. It is a further disadvantage of these systems that it is rather difficult to pick up a target as small as a torpedo at any reasonable range. It is the intent of the present invention to overcome these objections, and in so doing provide a ranging method which obviates the transmission of an energy impulse to be echoed back and which in so doing eliminates the additional objection thereof of giving away ones own position through the transmission of such wave energy.

The torpedo direction locator of the instant invention is well adapted for pickup of sound signals emitted by a signal source away from the ship such as that emitted by an underwater vehicle or torpedo moving in the vicinity thereof. The assembly is constructed to translate an impulse received at the ship into electrical energy capable of operation of visual display apparatus in the control room or control station on shipboard. It is arranged to translate the emitted signal from a source away from the ship into visual-means-output indicative of the instantaneous location, direction, path of travel, and rate of speed of the underwater missile with respect to the ship's location and additionally with respect to the ship's path of travel. The device may also be adapted for providing indications as to the compass direction and bearing of the missile and to give course indicative information with respect to a compass data reference.

The sound reception device comprises a hydrophone located at a single point or a plurality of points below the water line of the ship. The microphones thereof may be of a fixed or rotatable nature and may provide narrow beam or circular beam patterns depending on whether the microphones are stationary or rotatable. Additionally, combinations of narrow beam and wide beam microphones may be employed in a single microphone station unit.

The signal pickup information of the microphone is imparted through amplification apparatus to a visual indicator, as for example a cathode ray tube device or pointer indicating assembly and the direction of the source is correlated therewith through a suitable commutating system to produce direction indicative indications at the visual display station in correlation with the direction of the sound picked up by the mcrophone.

In the case of the cathode ray tube visual indicating system a circular sweep pattern is imparted thereto in a manner whereby a pip is produced on the sweep thereof in response to a signal pulse, which is picked up by the microphone unit, amplified and applied to the deflection plates of the cathode ray tube.

One object of the present invention is the provision of an acoustical direction finding system in which many of the foregoing disadvantages are obviated and which is adapted to perform satisfactorily all the essential functions of the systems heretofore or now in general use and in which the time of accomplishment of locating and ranging an underwater missile is materially reduced.

An additional object of the invention is the attainment of new and improved locating and ranging of an underwater misile.

Another object of the invention lies in the accomplishment by improved apparatus of underwater missile range and path of travel determinations individually or simultaneously from one or more of a plurality of receiving stations on shipboard.

Another object of the invention lies in the accomplishment by improved apparatus, the detection, ranging and determination of path of travel of a plurality of underwater missiles moving in the vicinity of a vessel.

An additional object of this invention resides in the use of a plurality of receiving devices whereby the translated impulses of the several receiving means will be so correlated as to provide a single visual indication of both range and bearing at the visual translation means.

An additional object of the invention resides in the provision of a device for the reception of a plurality of sounds each from remotely located sources at a given instant and for a given period of time thereafter and the translation of these several sound impulses at a common visual indicating means whereby the information derived therefrom may be used in the aiming of guns for firing torpedo demolition charges.

An additional object of this invention resides in the use of a cathode ray tube as a visual indicating device for display of received sound signals indicative of the location, range, path and rate of travel of an underwater objective moving in the vicinity thereto, wherein the visual display on the cathode ray tube is produced by a plural gun arrangement thereof embodied in a single envelope to provide indications on a suitably calibrated screen thereof.

An additional object of this invention resides in the provision of a device for the reception at a given instant, and for a given period of time thereafter of a plurality of missile indicative underwater sounds each from remotely located sources, and the subsequent translation of these several sound impulses for application at a cathode ray tube visual indicating device of a type embodying a two gun display system, whereby underwater missile location, range, path and rate of travel information derived therefrom may be used in aiming the torpedo demolition guns of the ship firing system.

It is also an object of this invention to provide an improved method of aiming the guns used in the firing of anti-torpedo charges by translating sounds resulting from the movement of the torpedo propeller through the water into useful impulses which control the plotting of the azimuthal bearing, instantaneous range, and path of travel of the torpedo missile, or a plurality of missiles, and the subsequent aiming of the anti-torpedo firing means.

Other objects and advantages of this invention will appear or be obvious from the hereinafter set forth description of the method of operation, combination of elements and arrangement and association of parts all as will be best understood by reference to the following complete description and accompanying drawings, wherein like reference characters refer to like or similar elements in the several drawings and in which.

Figures 1, 5:
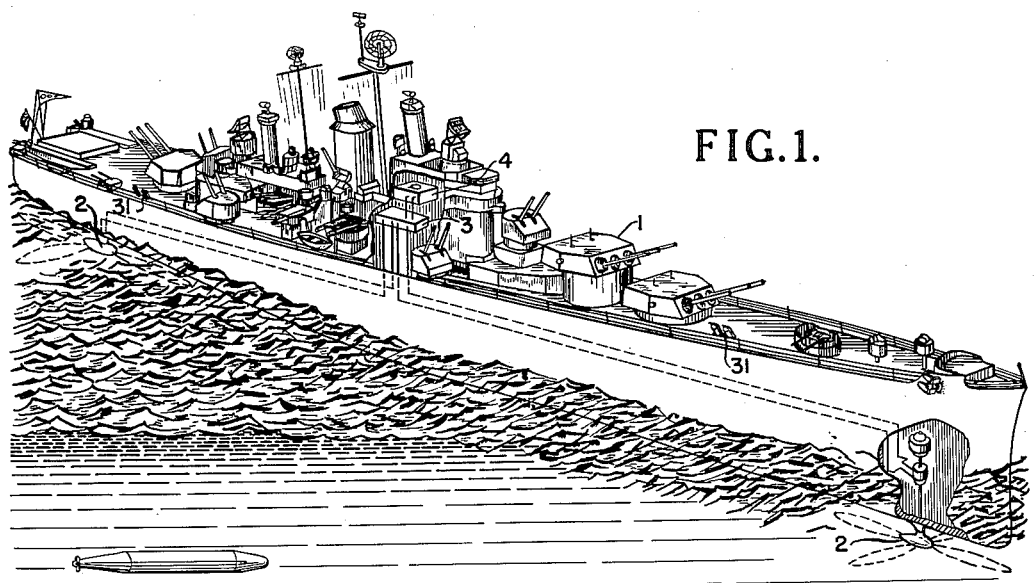
FIG. 1 is a generally schematic diagram in elevation showing the location of the receiving and indicating apparatus on shipboard.
FIG. 5 is a generally diagrammatical view in vertical section showing the detailed arrangement of one form of a rotatable hydrophone component for use with the above embodiments of FIGS. 1 through 4 of the instant invention.

Referring to FIG. 1 of the drawings for a generalized showing of the invention, a vessel of any character is shown at 1. This vessel which is to be protected against underwater missiles is provided with a sound receiving pickup device at 2, wherein the pattern of the microphone units of the pickup means are shown as narrow beam patterns. In FIG. 1 the dash lines indicate the narrow beam microphone characteristic, it being understood that a single unit having a combination of narrow and wide beam microphones for sound pickup may be used. These sound pickup devices are mounted on the ship at an underwater level and for purposes of illustration are shown on the keel thereof. The pickup devices are suitably connected through amplifying assemblies shown in block form at 3, to provide a raised power level signal, the output of which is applied to the direction indicating apparatus shown in block form at 4.

Figure 2:
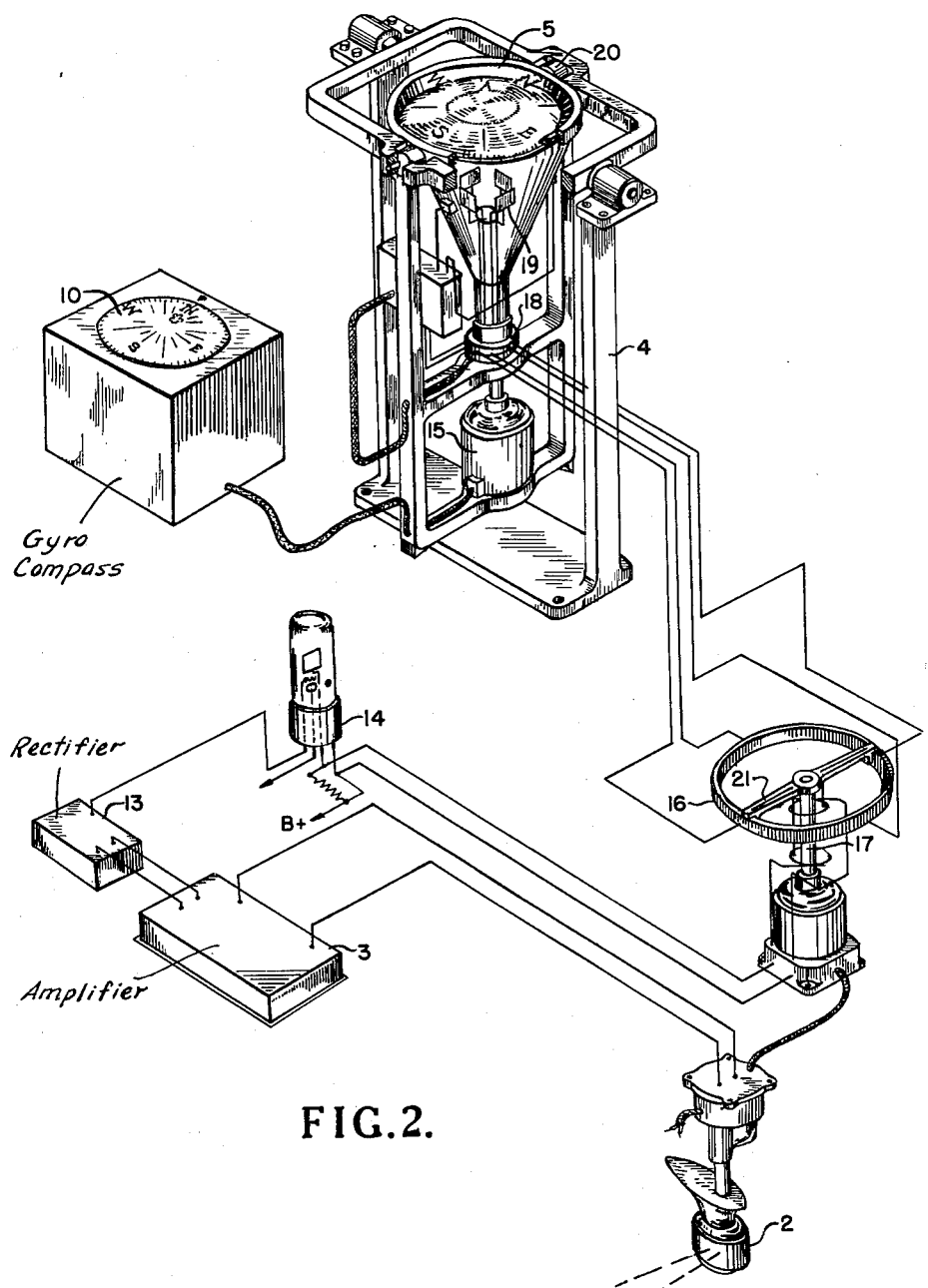
FIG. 2 is a diagram of one embodiment of the visual directional indicating means of the invention incorporating a single rotatable cathode ray tube and a single rotatable pickup means.
Figure 3:
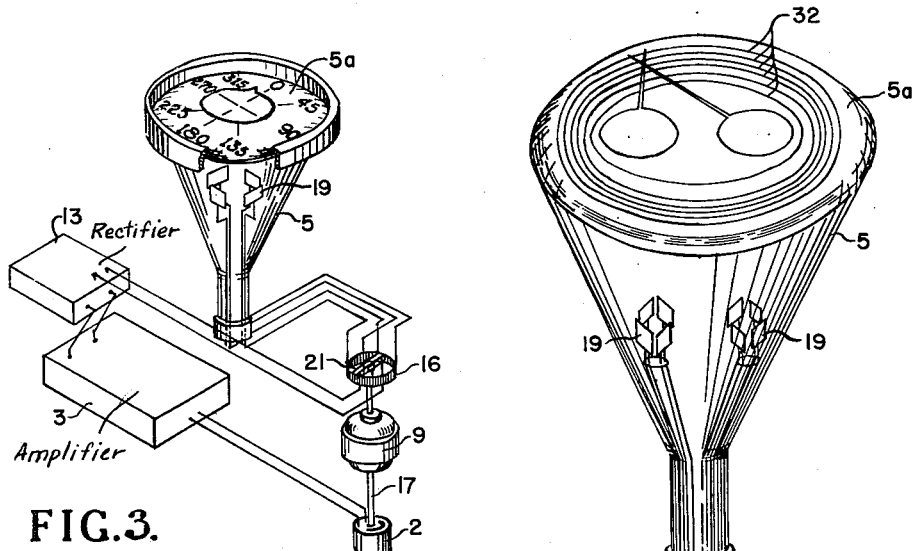
FIG. 3 is a diagram of an embodiment similar to FIG. 2, using a fixed tube.

The output of the amplifying unit may be applied to a cathode ray tube 5 of the type shown in FIGS. 2 and 3, in a manner whereby a circular sweep pattern is applied to the trace thereof and further wherein a pip or nodal image will be produced on the circular sweep in a correlated relationship with the position of a sound emitted by a missile and detected by the hydrophonic pickup 2. The thus produced nodal image is indicative of the direction of the sound source with respect to a given axis of the cathode ray tube. In the showing of FIG. 3 the reference axis of the cathode ray tube is on or parallel with the longitudinal axis of the vessel.

The embodiment of FIG. 2 incorporates a gimbal-mounted driven cathode ray tube which is so coupled through the tube drive motor 15 with a gyro compass 10 as to be rotated in synchronism therewith. Target missile indications produced thereon are in correlation with the gyro compass 10 and provide true bearing-information indications of the received sound. This embodiment using a rotatable cathode ray tube provides certain advantages over the use of a fixed tube in which the reference axis thereof is correlated only with respect to the axis of a vessel. It is thus apparent that any change in the course of the vessel will change the position of the node with respect to the reference axis. However, with the rotatable tube a change in the ship's course will not register as a change in the position of the nodal image as it will on the non-rotatable tube arrangement, but will change only with missile travel. The result is that with the use of a rotatable cathode ray tube, plotting is simplified. The only positional change in the nodal image in the latter system is with a change in the path of travel of the objective. In some cases wherein the objective is following a collision course with the ship, indications on the rotatable tube may thus remain substantially fixed. The image will however show a generally uniform change or deviation with changes in position of the missile in travel when the target missile is following a non-collision course with respect to the vessel. Such image change across the tube face provides interpretable information indicative of the missile's by-passing the vessel. The rate of change of position of the missile indicative image provides rate of travel data on the target.

The underwater sound pickup device is shown in detail in FIG. 5.

The underwater sound pickup device is preferably enclosed within a streamlined casing 6 of Rho-C rubber or its equivalent and includes one or a plurality of hydrophonic components 7 immersed in oil 8 such as castor oil to effect transmission of the sound waves impressed by the water upon the pickup casing 6, to the sound sensitive areas of the hydrophonic elements 7. This hydrophone assembly is shown for purposes of illustration but it is to be understood that the inventive concept is not necessarily limited thereto since any suitable hydrophone may be used. In the assembled relationship thereof it includes a rotation imparting motor device at 9 to provide rotational drive therefor about a normally vertical axis or about such a substantially vertical axis as that of the ship. The hydrophonic units of the pickup device are electrically connected to an amplifier. The amplifier used therewith or one element thereof may if desired be mounted within the casing 6 and connected by means of a slip ring assembly 11 to a cable 12 which extends therefrom into the interior of the vessel and subsequently to the direction indicating apparatus 4.

The direction indicating apparatus circuit between the pickup device 2 and the cathode ray tube 5 is shown in FIG. 2 as including the amplifying apparatus 3, a rectifier 13 for the voltage output therefrom and a continuously conducting cold cathode tube 14. The output of this tube is connected to a commutating device 16 of either the bar type, or the resistance type such as the potentiometer shown for purposes of illustration. The commutating device has the moving contact 21 thereof mechanically coupled through the shaft 17 of the pickup drive motor 9 to the rotatable hydrophone. The commutator is connected electrically at the quadrant terminals thereof to the slip ring assembly 18 for the deflector plate elements 19 of a driven cathode ray tube of the indicator assembly 4. The commutated output of tube 14 provides a circular sweep pattern for the cathode ray tube. The embodiment shown in FIG. 2 includes a tube driven by a conventional gyro compass 10, the details of which are not shown. The driving of the cathode ray tube in correlation with, and by the compass serves to provide a bearing data correlation whereby the indication of a received sound will always be given in terms of the true bearing of the sound source, irrespective of the direction of the ship's course. In addition it indicates the true angular relationship between the objective's course and a reference indication corresponding to the ship's course.

The cathode ray tube assembly is suitably supported on a system of gimbal rings and bearings 20. The rotated hydrophone 2 of this system may be a single unit of the narrow beam type, and the use of such a unit with a suitable commutation means 16 provides for the impression of a single nodal image indicative of the bearing of the sound source on the sweep of the screen of the cathode ray tube as hereinafter described. The application of the commutating device 16 in this circuit is such that upon the tube 14 continuously conducting current to the several resistance circuits of the said commutating means, and upon the continuous impression of voltages through the respective branches of these circuits to the slip ring structure and ultimately to the several plates of the cathrode ray tube a circular sweep is produced on the screen of the cathode ray tube. The impression of a voltage increase in response to a received sound signal through the movable contact 21 under rotation by the hydrophone drive motor 9 produces an outward radial displacement of a portion of the sweep on the cathode ray tube in the form of a pip or node. Observation of the position of the node and the tendency of the node to shift in position provides an indication of the course of travel of the objective missile, and in the case of the absence of change in position the resulting interpretation of the indication is that of a collision course of the objective and vessel.

The system of FIG. 3 is similar to that of FIG. 2 with the exception that the cathode ray tube is not rotatable and the indications on the tube are given with reference to a predetermined fixed axis of the tube and hence of the vessel. This system shows the position of the received sound in terms of the true relationship thereof with the axis of the ship, but does not give the true compass bearings of the sound source. In this embodiment the slip ring structure for the tube is eliminated and the connections between the commutating device 16 and the non-rotatable cathode ray tube are fixed.

Figure 4:
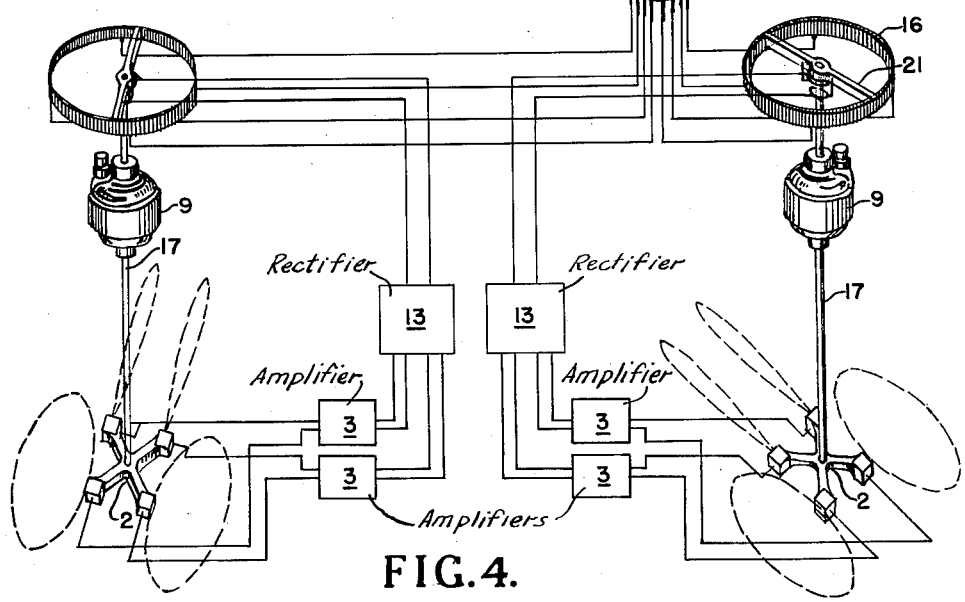
FIG. 4 is a diagrammatical illustration of a system incorporating a plurality of pickup circuits having their separate nodal images impressed on a single visual indicator calibrated in terms indicative of the range of the objective.

For purposes of simplicity in illustration the apparatus arrangement of FIG. 4 is shown as including a fixed or non-rotatable cathode ray tube although it is to be understood that the plural feed-in circuit shown therein is equally well adaptable for use with a cathode ray tube of the type shown and described above with reference to FIG. 2.

The apparatus and method of either FIG. 2 or FIG. 3 is further adaptable for use in determining the range of the received sound source as shown by the arrangement of FIG. 4 wherein a plurality of multiple units combining highly directional and broad beam remotely located hydrophones 2 are rotated by their respective motors 9 through their shafts 17 so as to sweep through 360° at a convenient rate as for example ten revolutions per second. The rotating contact 21 of the commutating device 16 which is mechanically coupled to the shaft 17, is in its respective electrical circuit of the deflector plates 19 of the dual cathode ray tube 5. With a fixed bias applied to the deflector plates, the beam spot of the cathode ray tube traces a pair of circles on the screen 5a thereof. In the event the hydrophones sweep a sound source such as an approaching torpedo, the outputs of their respective amplifiers 3 are fed into the respective bias of the corresponding set of deflector plates to add a bump or node on the circular trace or sweep of the tube screen. The voltage added by the amplifier and impressed upon the respective deflector plate bias circuit is made sufficiently high to cause the pip or node to appear as along narrow line. The intersection of the two lines then provides a point on the screen's calibrated scale indicating the position of the sound source and the indicated distance from the tube center to the above mentioned point provides an indication of the instantaneous range of the sound source. Continued observation of the point of intersection of the two traces on the screen provides an indication of the path of travel of the objective.

Obviously many modifications and variations of the present invention are possible in the light of the above teachings. It is therefore to be understood that within the scope of the appended claim the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

Apparatus for use aboard a ship for detecting, ranging and determining the azimuth of an underwater missile emitting characteristic sounds as it moves through the water, comprising in combination; a plurality of rotatable, directionally responsive, hydrophones in the aft portion of said ship; motor means connected to said hydrophones to provide rotation thereof; a dual beam cathode ray oscilloscope having first and second sets of deflection plates and a reference axis fixed with respect to the longitudinal axis of said ship, first means connected between said hydrophones and said first set of deflection plates and driven by said motor means to provide a generally circular display centered on said reference axis, and to produce an elongated pip on said circular display when said hydrophones detect said missile, the position of said pip with respect to the center of said circular display being correlative to the bearing of the missile with respect to said hydrophones; said first means including a rectifier, a potentiometer driven by said motor means for synchronous rotation with said hydrophones and being connected between said rectifier and said first set of deflection plates, and means connected between said hydrophones and said rectifier for amplifying the signal produced by said hydrophones; a second plurality of rotatable, directionally responsive hydrophones in the bow portion of said ship; second motor means connected to said second hydrophones to provide rotation thereof; second means connected between said second hydrophones and said second set of deflection plates and driven by said second motor means to provide a second generally circular display on the face of said oscilloscope displaced from said first display and centered on said reference axis and to produce a second elongated pip on said second circular display when said second hydrophones detect said missile, the position of said second pip with respect to the center of said second circular display being correlative to the bearing of the missile with respect to said second hydrophones; said second means including a second rectifier, a second potentiometer driven by said second motor means for synchronous rotation with said second hydrophones and being connected between said second rectifier and said second set of deflection plates, and means connected between said second hydrophones and said second rectifier for amplifying the signal produced by said second hydrophones; and range indicating indicia formed on the face of said cathode ray oscilloscope whereby the range indicia at the intersection of said first and said second pips indicates the range to said underwater missile.

References Cited in the file of this patent

UNITED STATES PATENTS

| | | |
|---|---|---|
| 2,209,191 | Dearing | July 23, 1940 |
| 2,368,953 | Walsh | Feb. 6, 1945 |
| 2,405,604 | Pope | Aug. 13, 1946 |
| 2,405,694 | Herzmark | Aug. 13, 1946 |
| 2,411,071 | Wade | Nov. 12, 1946 |
| 2,423,829 | Ferrel | July 15, 1947 |
| 2,426,208 | Hardy | Aug. 26, 1947 |
| 2,426,654 | White | Sept. 2, 1947 |
| 2,427,219 | Luck | Sept. 9, 1947 |
| 2,432,101 | Shepard | Dec. 9, 1947 |
| 2,473,974 | Schuck | June 21, 1949 |
| 2,504,118 | Evans | Apr. 18, 1950 |
| 2,516,343 | Roberts | July 25, 1950 |
| 2,688,130 | Whitaker et al. | Aug. 31, 1954 |
| 2,731,633 | O'Kane et al. | Jan. 17, 1956 |

FOREIGN PATENTS

| | | |
|---|---|---|
| 703,148 | France | Dec. 4, 1929 |